(12) United States Patent
Subramanian et al.

(10) Patent No.: US 6,459,883 B2
(45) Date of Patent: Oct. 1, 2002

(54) GENERIC FINGER ARCHITECTURE FOR SPREAD SPECTRUM APPLICATIONS

(75) Inventors: Ravi Subramanian, Mountain View, CA (US); Keith Rieken, Cupertino, CA (US); Uma Jha, Placentia, CA (US); David M. Holmes, Cupertino, CA (US); Joel D. Medlock, Los Gatos, CA (US); Murali Krishnan, San Jose, CA (US)

(73) Assignee: Morphics Technology, Inc., Campbell, CA (US)

( * ) Notice: Subject to any disclaimer, the term of this patent is extended or adjusted under 35 U.S.C. 154(b) by 0 days.

(21) Appl. No.: 09/920,094

(22) Filed: Jul. 31, 2001

Related U.S. Application Data

(60) Provisional application No. 60/222,009, filed on Jul. 31, 2000, provisional application No. 60/222,030, filed on Jul. 31, 2000, and provisional application No. 60/222,828, filed on Aug. 3, 2000.

(51) Int. Cl.$^7$ ................................................ H04B 17/00
(52) U.S. Cl. .................... 455/67.1; 455/67.6; 375/142; 375/144
(58) Field of Search ................................. 455/130, 131, 455/67.1, 67.6; 375/142, 144, 148, 150

(56) References Cited

U.S. PATENT DOCUMENTS

| | | | | |
|---|---|---|---|---|
| 5,640,431 A | * | 6/1997 | Bruckert et al. | ............. 375/344 |
| 5,691,974 A | * | 11/1997 | Zehavi et al. | ................ 370/203 |
| 5,943,375 A | * | 8/1999 | Veintimilla | ................... 375/355 |
| 6,229,841 B1 | * | 5/2001 | Levin et al. | ................. 375/147 |
| 6,304,563 B1 | * | 10/2001 | Blessent et al. | ............. 370/335 |

* cited by examiner

*Primary Examiner*—Daniel Hunter
*Assistant Examiner*—Lana Le
(74) *Attorney, Agent, or Firm*—Pennie & Edmonds LLP

(57) ABSTRACT

A rake receiver in accordance with an exemplary embodiment of this invention is configurable by an external agent (e.g., microcontroller, DSP, or state machine) to suit the particular requirements of different spread spectrum systems. In an exemplary embodiment, the receiver includes multiple fingers. Each finger includes a plurality of generic despreaders/descramblers, a plurality of generic dechannelizers coupled to the despreaders/descramblers, and at least one timing estimation controller coupled to the despreaders/descramblers. The finger also includes at least one phase estimation controller, at least one frequency estimation controller, and at least one energy estimation controller all coupled to the generic dechannelizers.

13 Claims, 12 Drawing Sheets

GENERIC FINGER ARCHITECTURE FOR SPREAD SPECTRUM APPLICATIONS

PRIORITY DATA

This application claims priority from the following Provisional Applications:

(1) "Generic Finger Architecture for W-CDMA Applications," bearing U.S. Ser. No. 60/222,009, filed on Jul. 31, 2000;

(2) "Generic Data Path Processor for W-CDMA Applications," bearing U.S. Ser. No. 60/222,030, filed on Jul. 31, 2000; and (3) "Flexible CDMA System Architecture," bearing U.S. Ser. No. 60/222,828, filed on Aug. 3, 2000.

CROSS REFERENCE TO RELATED APPLICATIONS

Related applications are:

"Apparatus and Method for Configurable Multi-dwell Search Engine for Spread Spectrum Applications", Ser. No. 09/919,700, filed concurrently herewith;

"Method and Apparatus for Time-sliced and Multi-threaded Data Processing in a Communication System", Ser. No. 09/920,093, filed concurrently herewith;

"Apparatus and Methods for Sample Selection and Reuse of Rake Fingers in Spread Spectrum Systems", Ser. No. 09/920,095, filed concurrently herewith; and "Distributed Micro Instruction Set Processor Architecture for High-efficiency Signal Processing", Ser. No. 09/912,721, filed Jul. 24, 2001.

Each of these applications are incorporated herein by reference.

BACKGROUND OF THE INVENTION

This invention relates generally to wireless communication systems.

Wireless communication has extensive applications in consumer and business markets. Among the many communication applications/systems are: mobile wireless, fixed wireless, unlicensed Federal Communications Commission (FCC) wireless, local area network (LAN), cordless telephony, personal base station, telemetry, encryption, and others. Generally, each of these applications utilizes unique and incompatible modulation techniques and protocols. Consequently, each application may require unique hardware, software, and methodologies for processing digital signals, such as generating the codes required for encoding and for decoding a signal, modulation, demodulation, and other processes. This practice can be costly in terms of design, testing, manufacturing, and infrastructure resources. As a result, a need arises to overcome the limitations associated with the varied hardware, software, and methodologies of processing digital signals in each of the varied applications.

In practice, multiple copies of the same signal are typically received at communications device 100 within a short time of each other. These copies, which are sometimes called multipath components arise because the signals take different paths of different length from the transmitter antenna to the receiver antenna. In the case of a CDMA system, it is feasible and advantageous to despread and decode several of the multipath components, realign them so that they are also in phase and combine them to produce a stronger signal. To do this, the base band processor in a CDMA system typically takes the form of a rake receiver that has several fingers, each one of which is a receiver that despreads and decodes one of the multipath components. General information about rake receivers can be found at pages 972–982 of J. S. Lee, L. E. Miller, *CDMA Systems Engineering Handbook* (Artech House 1998).

Service providers and network operators often need to support multiple standards with existing rake receivers. Therefore, it is desirable to provide a flexible and programmable generic rake receiver architecture suitable for different spread spectrum systems at a minimal development cost.

SUMMARY OF THE INVENTION

A rake receiver in accordance with an exemplary embodiment of this invention provides an integration of generic, inexpensive components in a fully configurable manner. The rake receiver is configurable by an external agent (e.g., microcontroller, DSP, or state machine) to suit the particular requirements of each system. In an exemplary embodiment, each finger in the rake receiver includes multiple generic despreaders/descramblers, multiple generic dechannelizers coupled to the despreaders/descramblers, and at least one timing estimation controller coupled to the despreaders/descramblers. Each finger also includes at least one phase estimation controller, at least one frequency estimation controller, and at least one energy estimation controller all coupled to the dechannelizers.

DETAILED DESCRIPTION OF THE INVENTION

Figure 1:
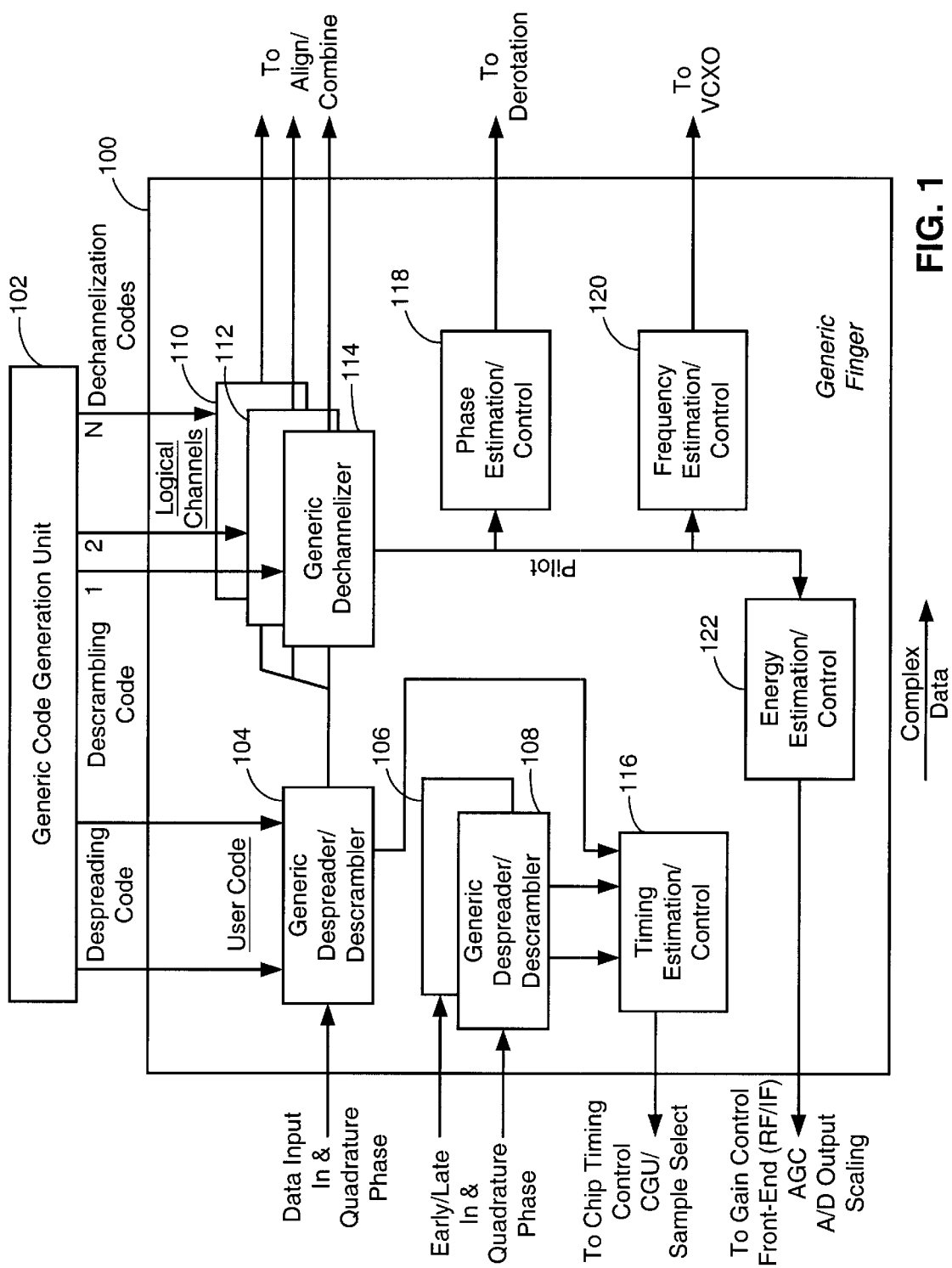
FIG. 1 illustrates an exemplary configurable receiver finger in accordance with an embodiment of the invention.

FIG. 1 illustrates an exemplary finger 100 of a rake receiver. The finger 100 receives codes generated from a generic code generation unit 102. The finger 100 includes multiple generic despreaders/descramblers 104, 106, 108, multiple generic dechannelizers 110, 112, 114, at least one timing estimation controller 116, at least one phase estimation controller 118, at least one frequency estimation controller 120, and at least one energy estimation controller 122.

Samples, including "on-time," "early," and "late" samples, are selected from a front-end sample select block (not shown) and input into the generic despreaders/descramblers 104–108. The generic despreaders/descrambler 104 provides multiple inputs to the generic dechannelizers 110–114. The generic despreaders/descramblers 106, 108 provide early and late sample inputs to the timing estimation controller 116. In an exemplary embodiment, the timing estimation controller 116 includes a delay lock loop (DLL) (see FIGS. 8 and 9 below) to produce the timing offset of the received signal with respect to the on-time arrival path. The DLL can be operated either coherently or non-coherently, according to link design. In an exemplary embodiment, the output of the timing estimation controller goes to timing controller for performing sample selection.

The generic dechannelizers 110–114 strip user specific code (e.g., Walsh, OVSF code), and produce information symbols for use in aligning and combining apparatus elsewhere with receiver (not shown). In addition, the generic dechannelizers 110–114 produce a signal that is fed to the phase 118, frequency 120, and energy 122 estimation controllers. The phase 118, frequency 120, and energy 122 estimation controllers provide the necessary instrumentation for various error control loops in the system. For example, the energy estimation controller 122 provides inputs to front end gain control or automatic gain control (AGC) to achieve analog/digital output scaling.

In an exemplary embodiment, the timing estimation controller 116, the phase estimation controller 118, the frequency estimation controller 120, and the energy estimation controller 122 are partially implemented in an instruction set processor, such as a dedicated digital signal processor (DSP), and partially implemented in parameterizable hardware, such as application specific integrated circuits (ASICs). In one embodiment, the timing estimation controller 116 and the phase estimation controller 118 are implemented in a finger DSP and the frequency estimation controller 120 and the energy estimation controller 122 are implemented in a combiner DSP.

The architecture as shown in FIG. 1 is fully configurable by an external agent (e.g., microcontroller, DSP, or a state machine) to suit particular requirements of each system. The generic despreaders/descramblers 104–108 can be programmed as a real or a complex correlator depending on requirements in a particular W-CDMA system. Similarly, the dechannelizers 110–114 are configurable to suit any existing or future standards. In addition, this generic finger architecture is adaptable to both base stations and terminal devices (e.g., handheld device).

The Generic Code Generation Unit

A code generator is a device that generates predetermined code sequences used for code modulation and demodulation prescribed by a given communication protocol. For example, a conventional code generator can load an initial state into a linear feedback shift register (LFSR) then iteratively generate sequential values of the code sequence.

Figure 2:
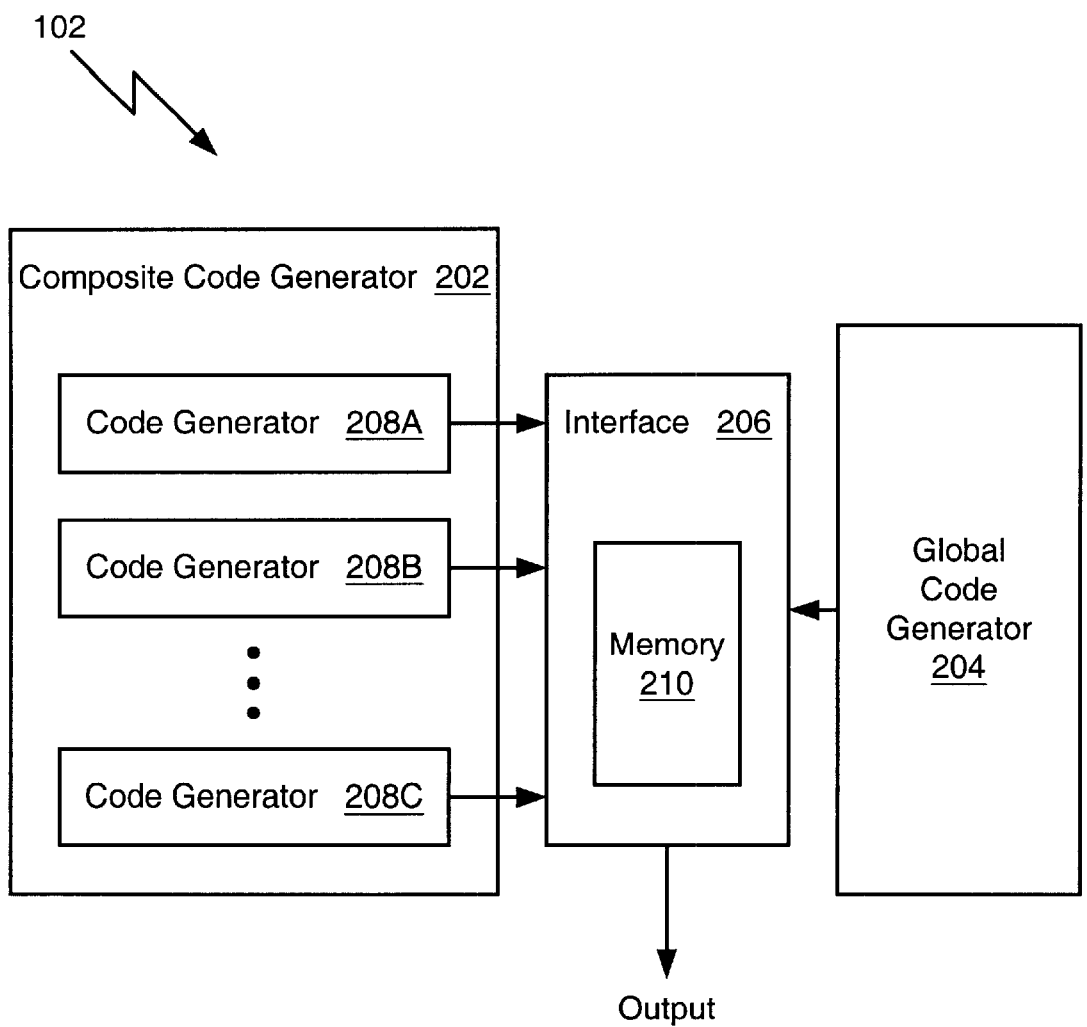
FIG. 2 illustrates an exemplary configurable generic code generation unit in accordance with an embodiment of the invention.

FIG. 2 illustrates an exemplary generic code generation unit 102 in accordance with an embodiment of the invention. The generic code generation unit 102 can be used for any one of a wide variety of spread spectrum applications. The generic code generation unit 102 includes a composite code generator 202, a global code generator 204, and an interface 206 that is coupled to the composite code generator 202 and the global code generator 204. The composite code generator 202 has multiple independent code generators 208A–C, each capable of generating an independent code sequence. The global code generator 204 provides a global code sequence for synchronization. The interface 206 has memory 210 that stores at least one bit of the global sequence and at least one bit from at least one of the independent code sequences of the composite code generator 202. Multiple subsequent circuits (not shown) can selectively choose one or more of the code sequences from the interface 206 simultaneously and in parallel, as dictated by a desired communication protocol.

Figure 3:
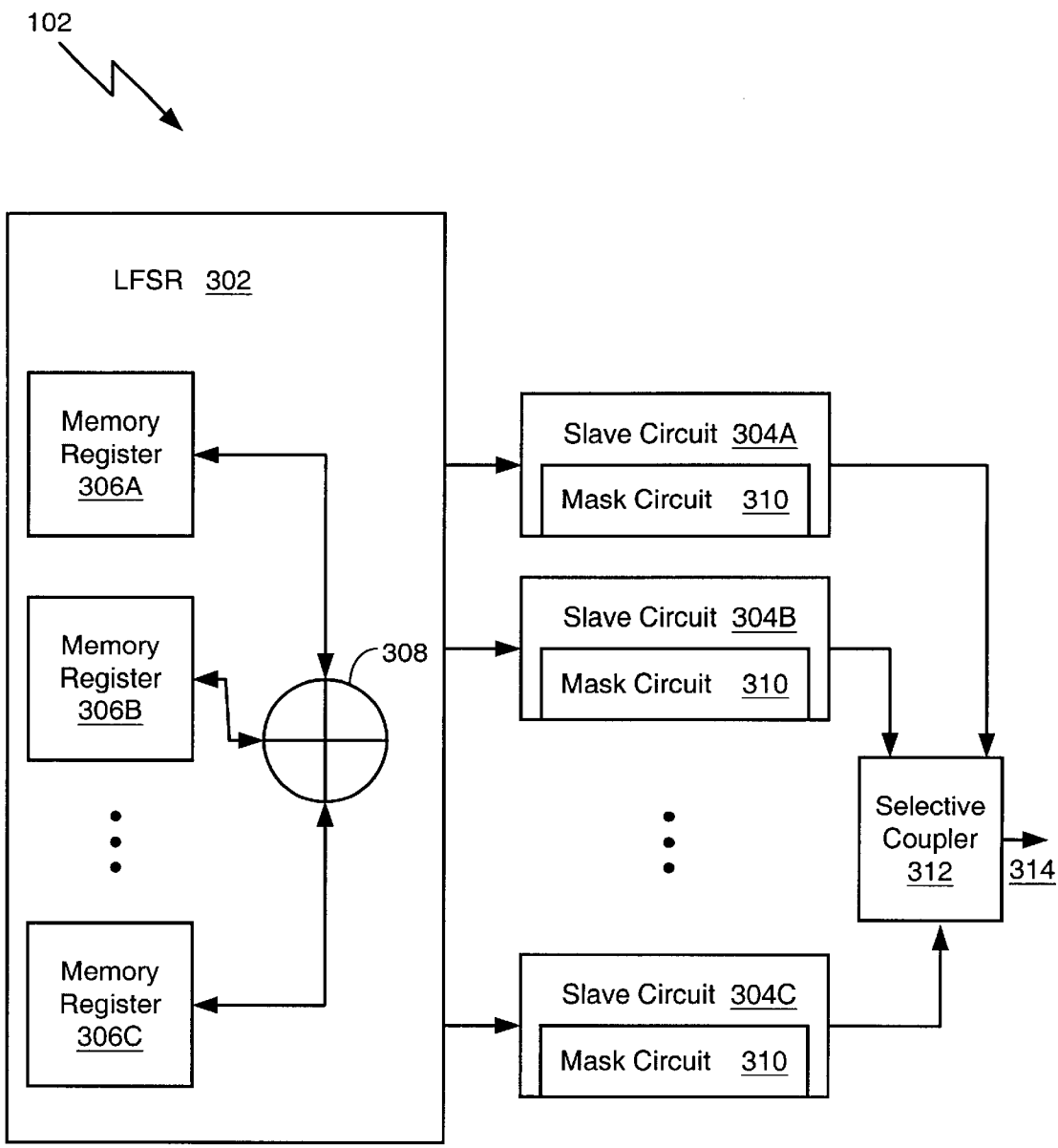
FIG. 3 illustrates another exemplary configurable generic code generation unit in accordance with an embodiment of the invention.

FIG. 3 illustrates another exemplary generic code generation unit 102 in accordance with an embodiment of the invention. The generic code generation unit 102 includes a linear feedback shift register (LFSR) 302 and multiple slave circuits 304A–C. The multiple slave circuits 304 are coupled in parallel to the LFSR 302. The LFSR 302 itself has multiple memory registers 306A–C and at least one adder 308 coupled to the multiple memory registers 306 for providing feedback. Each of the plurality of slave circuits 304 has a mask circuit 310 for receiving a unique mask word. The unique mask word corresponds to a unique offset in code space from the master linear feedback shift register 302. As a result, each of the multiple slave circuits 304 provides a code sequence output in parallel. The generic code generation unit 102 also includes a selective coupler 312 that is coupled to the output from each of the plurality of slave circuits 304 and coupled to a final output line 314. The selective coupler 312 allows a single desired code sequence to be provided from the generic code generation unit 102.

Alternatively, in an exemplary embodiment, the generic code generation unit 102 includes multiple independent code generators coupled together by a multiplexer that selects the appropriate code/generator type based on the applicable standard and protocol.

Additional information regarding exemplary architectures of the generic code generation unit 102 can be found in co-pending U.S. Patent Application entitled "A Configurable Code Generator System for Spread Spectrum Applications," bearing application Ser. No. 09/751,782, filed on Dec. 29, 2000. This application is commonly assigned and is hereby incorporated for all purposes.

The Generic Despreaders/Descramblers

Complete demodulation of the radio waveform requires that the signal be processed in a specific step referred to as "despreading." The channel codes utilized for despreading relate to the interference rejection and multiple access capability of the radio receiver design. A despreader/descrambler is a component used in spread spectrum wireless communication receivers as a subsystem required to detect a signal. A despreader/descrambler receives a spread spectrum data signal and performs inner-product operations with known despreading code sequences to despread the signal and form a symbol.

Figure 4:
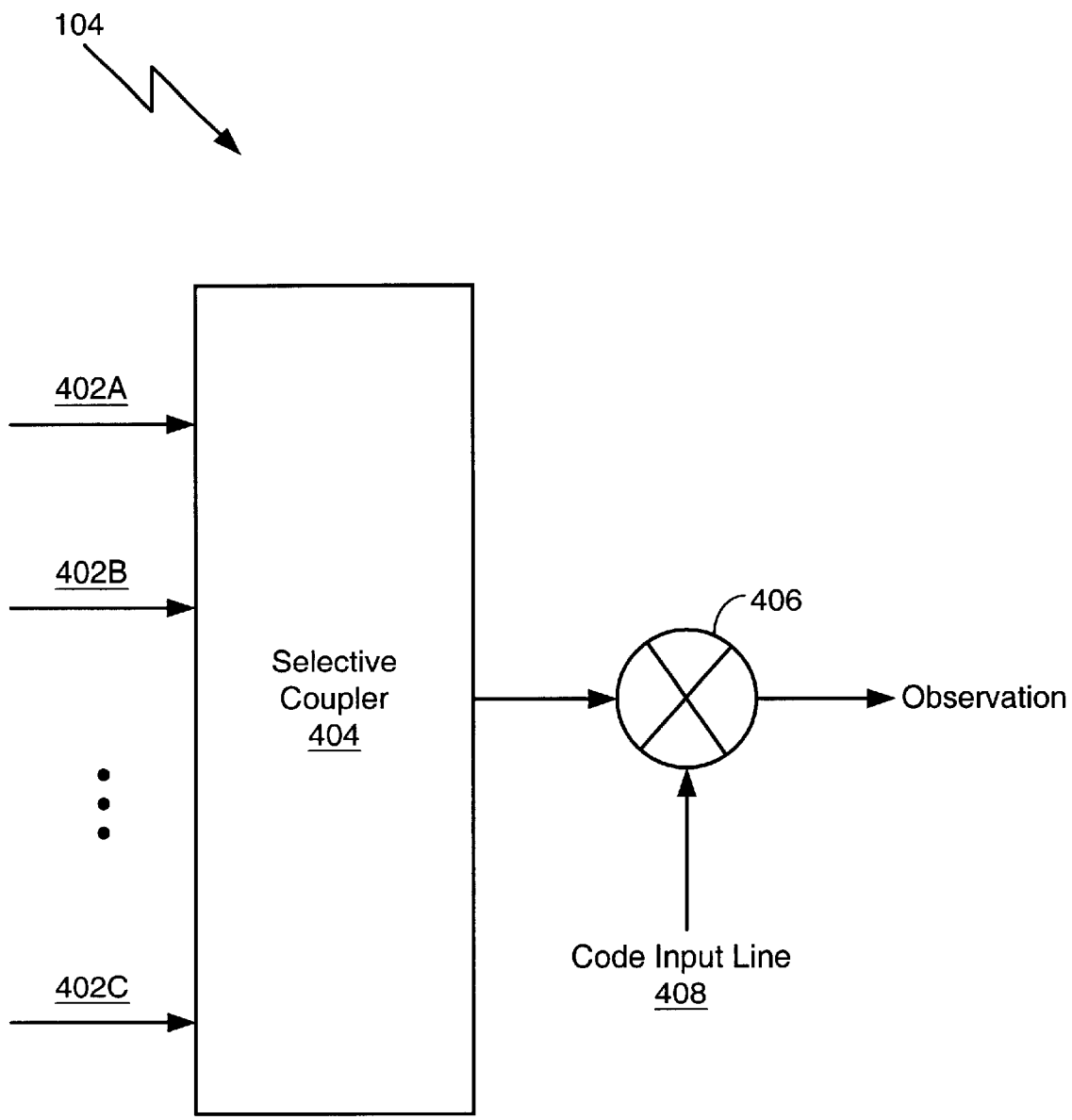
FIG. 4 illustrates an exemplary configurable generic despreader/descrambler in accordance with an embodiment of the invention.

FIG. 4 illustrates an exemplary generic despreader/descrambler 104 in accordance with an embodiment of the invention. The despreader/descrambler 104 includes a plurality of data lines 402A–C, at least one selective coupler 404 coupled to the plurality of data lines 402, at least one multiplier 406 coupled to the selective coupler 404, and a code input line 408 coupled to the multiplier 406. The selective coupler 404 selectively couples one of the plurality of data lines 402 with the multiplier 406 in accordance with one of a plurality of despreading protocols. The multiplier 406 then multiplies the data signal on a desired input data line selected by the selective coupler 404 with a despreading code received from the code input line 408 to produce the received symbol.

Figure 5:
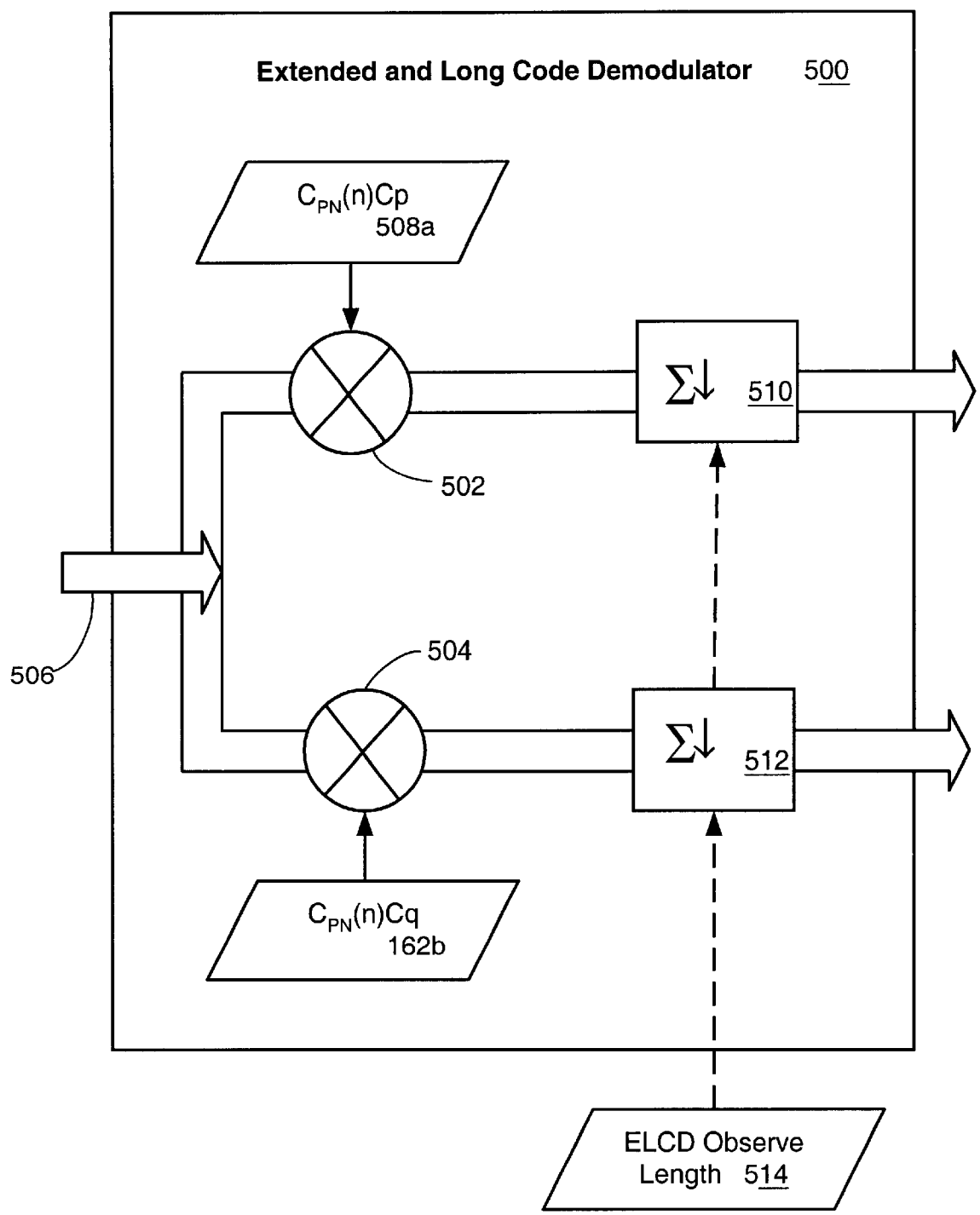
FIG. 5 illustrates another exemplary configurable generic despreader/descrambler in accordance with an embodiment of the invention.

FIG. 5 illustrates another exemplary generic despreader/descrambler 104 in accordance with an embodiment of the invention. In FIG. 5, a configurable extended and long code demodulator (ELCD) 500 is configured as a despreader/descrambler 104. The ELCD 500 has two parallel branches, one for the in-phase portion of the signal, and one for the quadrature portion of the signal. In particular, the ELCD 500 has a first multiply-logic device 502 and a second multiply-logic device 504, both of which are coupled to input 506. Multiply-logic device 502 has an input 508a to receive a code sequence, $C_{PN}(n)C_p$. The code sequence, $C_{PN}(n)C_p$, is a product of a unique long pseudonoise (PN) sequence for user 'n', $C_{PN}(n)$, and an in-phase portion of a complex extended PN sequence, $C_p$. Similarly, multiply-logic device 504 has an input 508b to receive a code sequence, $C_{PN}(n)C_q$, which is a product of the same unique long pseudonoise (PN) sequence and a quadrature-phase portion of a complex extended PN sequence, $C_q$. In the present embodiment, the ELCD 500 can demodulate any extended and long code sequence, given the appropriate configuration instructions.

Accumulate-and-dump circuits 510 and 512, are coupled to multiply-logic devices 502 and 504, respectively. Both accumulate-and-dump circuits 510 and 512 have inputs to receive an observation length 514 that establishes the number of accumulate operations required before a dump operation is performed. Thus, accumulate-and-dump circuits 510 and 512 have a configurable accumulate, or integration, length. In this manner, the present invention allows the ELCD 500 to be configured for a given user, application, and/or performance level. Accumulate-and-dump circuits, 510 and 512, provide a real, e.g., in-phase, code demodulated sample on line 516 and a complex, e.g., quadrature-phase, code demodulated sample on line 518, respectively. In an exemplary embodiment, the first accumulate-and-dump circuit 510 and the second accumulate-and-dump circuit 512 each have separate add-logic devices for adding the in-phase portion and the quadrature-phase portion of a signal.

In an exemplary embodiment, the ELCD 500 includes configurable sub components and cross-coupling that allow different combinations of multiplication operations to be performed between the in-phase and quadrature-phase channel signal on line 506 and the in-phase and quadrature-phase code sequence inputs 508a and 508b. This configurabiltiy provides better accommodation of multiple transmission despreading and demodulating techniques.

Figure 6:
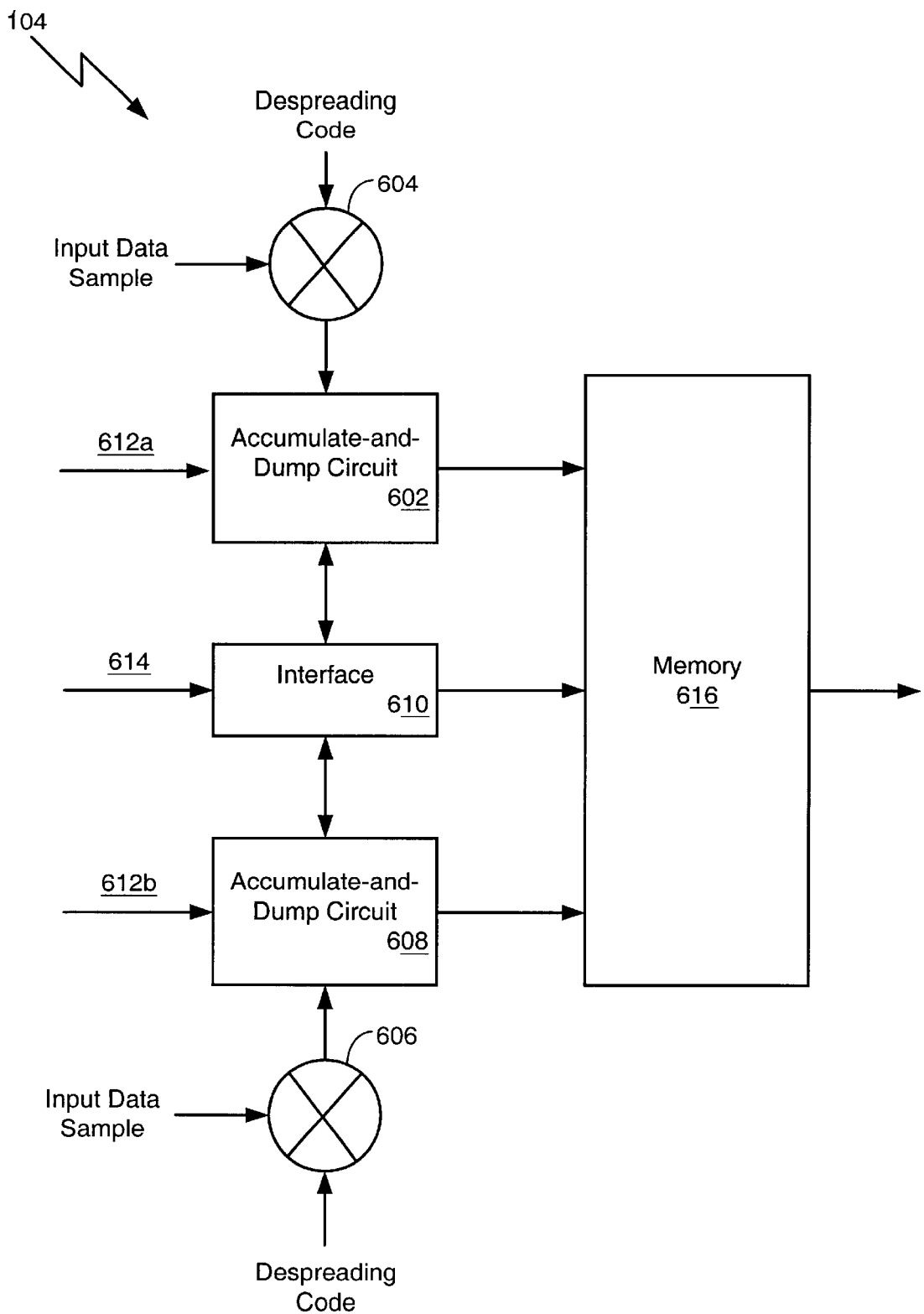
FIG. 6 illustrates another exemplary configurable generic despreader/descrambler in accordance with an embodiment of the invention.

FIG. 6 illustrates yet another exemplary despreader/descrambler 104 in accordance with an embodiment of the invention. The despreader/descrambler 104 includes multiple accumulate-and-dump circuits with a variable observation length for processing digital data. In FIG. 6, the generic despreader/descrambler 104 includes a first multiplier 604 coupled to a first accumulate-and-dump circuit 602. The multiplier 604 multiplies an input data sample with a despreading code. In an exemplary embodiment, the despreader/descrambler 104 also includes a second multiplier 606, a second accumulate-and-dump circuit 608, and an interface 610. The interface 610 is coupled to the first accumulate-and-dump circuit 602 and the second accumulate-and-dump circuit 608. Both accumulate-and-dump circuits 602, 608 have an enable input 612a and 612b that selectively dumps an accumulated result after a variable observation period (e.g., quantity of accumulate operations) has occurred. The interface 610 has an enable input 614 that allows it to generate an output by adding the results from the first accumulate-and-dump circuit 602 and the second accumulate-and-dump circuit 608. The output from the interface 610 is fed into a memory 616. The memory 616 is coupled to both accumulate-and-dump circuits 602, 608 and the interface 610, to provide a value that dictates the observation period of the accumulate-and-dump circuit 602 and the second accumulate-and-dump circuit 608.

Alternatively, in an exemplary embodiment, the generic despreader/descrambler 104 includes multiple independent despreaders/descramblers coupled together and a multiplexer that selects the appropriate despreader/descrambler based on the applicable standard and protocol.

In an exemplary embodiment, generic despreaders/descramblers 106 and 108 include the same architectures as described above for the generic despreader/descrambler 104.

Additional information regarding exemplary architectures of the generic despreaders/descramblers 104–108 can be found in co-pending U.S. Pat. Applications entitled "A Configurable Multimode Despreader for Spread Spectrum Applications" and "A Configurable All-Digital Coherent Demodulator System for Spread Spectrum Applications," bearing application Ser. Nos. 09/751,785 and 09/751,783, respectively. These applications were filed on Dec. 29, 2000. These applications were commonly assigned and are hereby incorporated for all purposes.

The Generic Dechannelizer

A demodulator/dechannelizer component is used in a wireless communication system for code demodulation and data demodulation of a received signal in order to provide the data signal. Pilot signals are used in transmission protocols to help the receiver estimate an unknown channel. Essentially, a pilot signal supports estimation of an unknown random variable with known data. Coherent demodulation solves part of the phase error problem by utilizing a pilot signal having known data, e.g., a pseudonoise (PN) data sequence. The PN data sequence is known to both the transmitter and the receiver. If the transmitter sends out a known pilot signal with a known PN sequence, then the receiver can determine the phase correction using an internally generated PN sequence that is identical to that of the transmitter.

Figure 7:
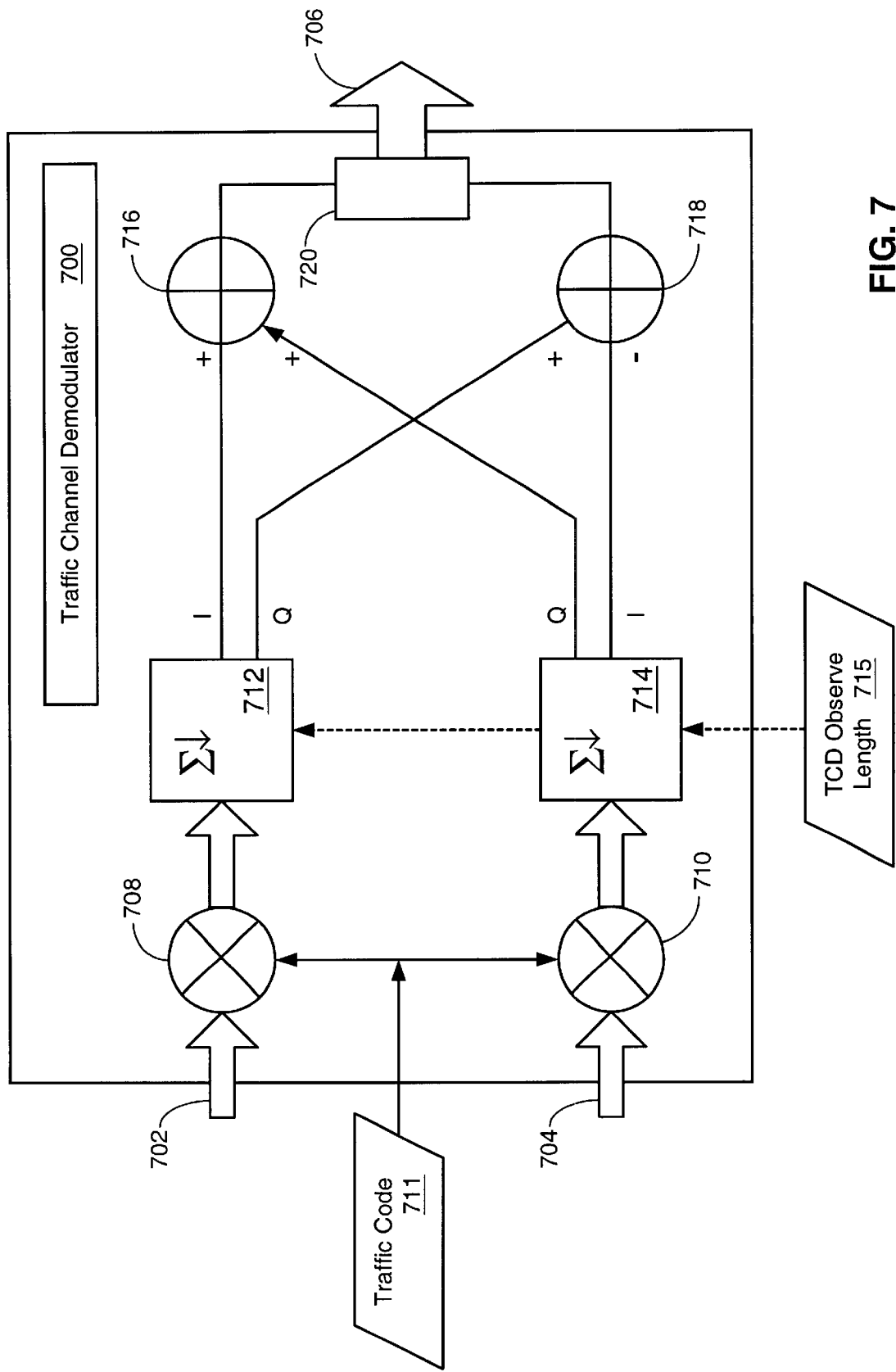
FIG. 7 illustrates an exemplary configurable generic dechannelizer in accordance with an embodiment of the invention.

FIG. 7 illustrates an exemplary generic dechannelizer 110 in accordance with an embodiment of the invention. In FIG. 7, a configurable traffic channel demodulator (TCD) 700 is implemented as a generic dechannelizer 110. The TCD 700 receives code demodulated samples on lines 702 and 704 and performs sample energy accumulation operations and multiple phase shift keying (MPSK) demodulation operations to produce a demodulated output data sample on line 706, which has not been corrected for phase errors. In an exemplary embodiment, the code demodulation samples are fed from the generic despreader/descrambler 104.

The TCD 700 has two parallel branches: one for operations to obtain a real sample and one for operations to obtain a quadrature-phase sample. In particular, the TCD 700 includes a first multiply-logic device 708 in one branch that is coupled to input line 702. Similarly, the TCD 700 includes a second multiply-logic device 710 in another branch that is coupled to input line 704. Both multiply logic devices 708 and 710 have inputs to receive a traffic code channel input 711. The TCD 700 can demodulate any traffic channel code sequence, given the appropriate configuration instructions. In an exemplary embodiment, the traffic code channel input 711 is a $W_d$ that is based on a short Walsh code. However, traffic code channel input 711 can be based on another code sequence in another embodiment.

A first accumulate-and-dump circuit 712 is coupled to the multiply-logic device 708, while a second accumulate-and-dump, or accumulator, circuit 714 is coupled to the multiply-logic device 710. Both accumulate-and-dump circuits 712 and 714 have inputs to receive an observation length 715 that establishes the number of accumulate operations required before a dump operation is performed on an in-phase portion and a quadrature-phase portion of the sum. Thus, accumulate-and-dump circuits 712 and 714 have a configurable accumulate, or integration, length. In this manner, the present invention allows the TCD 700 to be configured for a given user, application, and/or performance level. The first accumulate-and-dump circuit 712 and the second accumulate-and-dump circuit 714 each have separate add-logic devices for adding the in-phase portion and the quadrature-phase portion of a signal.

In an exemplary embodiment, the TCD 700 also includes a first adder-logic device 716 coupled to an output for an in-phase signal from the first accumulate-and-dump circuit 712 and coupled to an output for a quadrature-phase signal from the second accumulate-and-dump circuit 714. In a complementary manner, the TCD 700 includes a second adder-logic device 718 coupled to an output for a quadrature-phase signal from the first accumulate-and-dump circuit 712 and coupled to an output for a real signal from the second accumulate-and-dump circuit 714. Outputs from first adder-logic device 716 and second adder-logic device 718 are coupled to an interface 720 that provides a demodulated output data sample on line 706 to a subsequent block. In an exemplary embodiment, the interface 720 includes a memory buffer and circuitry for serial transmission of the in-phase and quadrature-phase portions of signals received from first adder-logic device 716 and from second adder-logic device 718. Alternatively, the interface 720 can be a bus of parallel lines, one for the in-phase portion of the signal and one for the quadrature-phase portion of the signal.

Alternatively, in an exemplary embodiment, the generic dechannelizer 110 includes multiple independent demodulators coupled together and a multiplexer that selects the appropriate dechannelizer type depending on the applicable standard or protocol.

In an exemplary embodiment, the generic dechannelizers 112 and 114 include the same architectures as described above for generic dechannelizer 110.

Additional information regarding exemplary architectures of the generic dechannelizers 110–114 can be found in co-pending U.S. Pat. Application entitled "A Configurable All-Digital Coherent Demodulator System for Spread Spectrum Applications," bearing application Ser. No. 09/751,783, filed on Dec. 29, 2000. This application was commonly assigned and is hereby incorporated for all purposes.

Timing Estimation Controller

Figure 8:
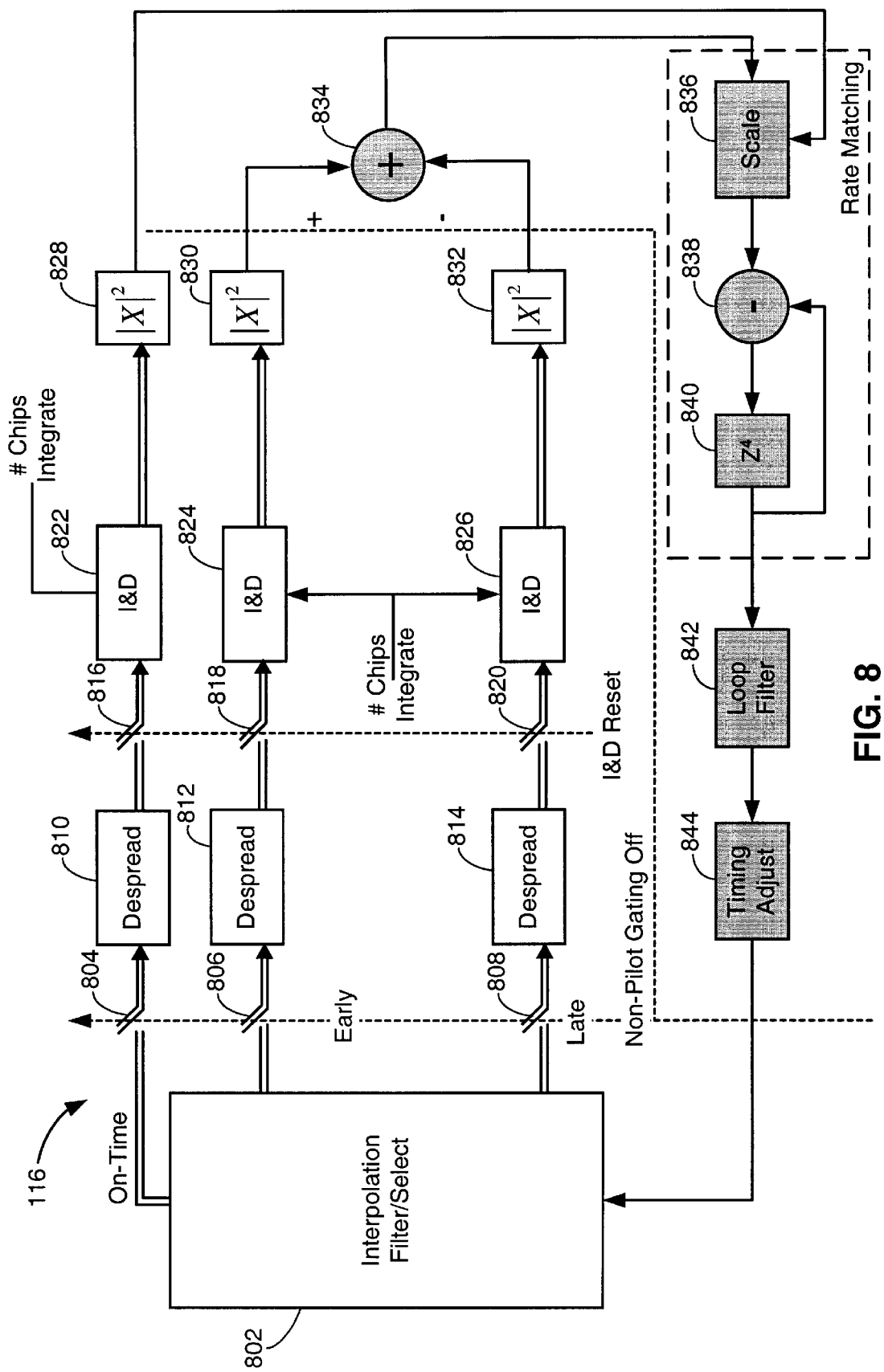
FIG. 8 illustrates an exemplary timing estimation controller in accordance with an embodiment of the invention.

FIG. 8 illustrates an exemplary timing estimation controller 116 in accordance with an embodiment of the invention. The timing estimation controller 116 receives Early, On-Time, and Late signals/samples from the generic despreaders/descramblers 106–108. In this embodiment, the Early, On-Time, and Late signals are processed in parallel in an Early arm, an On-Time arm, and a Late arm, respectively.

In an exemplary embodiment, an interpolation filter 802 up samples the data rate, before feeding the signals into the timing estimation controller 116. At the multiplexers 804–808, non-pilot signals are gated off. Pilot signals, which are allowed to pass, are fed into despreaders 810–814. Next, at the multiplexers 816–820, outputs from the despreaders 810–81 are fed into the integrate-and-dump circuits 822–826, which integrate the signals over a pre-determined number of chips and dump the results into magnitude squarers 828–832, respectively. The magnitude squarers 828–832 produce a delay lock loop discriminator characteristic. Next, the output from the Early arm is subtracted from the output from the Late arm in the arithmetic block 834 to yield an error signal value between the two (Early and Late) arms. The error signal value and the output from the On-Time arm are fed into a scale block 836 to be scaled. In an exemplary embodiment, the scale factor is based on the energy of the On-Time received signal. Next, the scaled signal is fed into an accumulator 838 that accumulates all the errors from different fingers (not shown). The accumulated error is then fed into a delay operator 840 that filters the received error. An average of the filtered error is calculated in the loop filter 842. Then a timing adjustment is performed in the timing adjustment block 844.

In an exemplary embodiment, the timing adjustment block 844 has access to a look-up table for obtaining an appropriate timing adjustment based on the average filtered error. In another exemplary embodiment, the timing adjustment block 844 performs a mathematical function known in the art for calculating a timing adjustment. The output from the timing adjustment block 844 is provided to chip timing control code generation unit/sample select (see FIG. 1) for additional processing. In an exemplary embodiment, the output is also fed back into the interpolation filter 802 for timing adjustment of the next signal to be fed into the timing estimation block 116.

Figure 9:
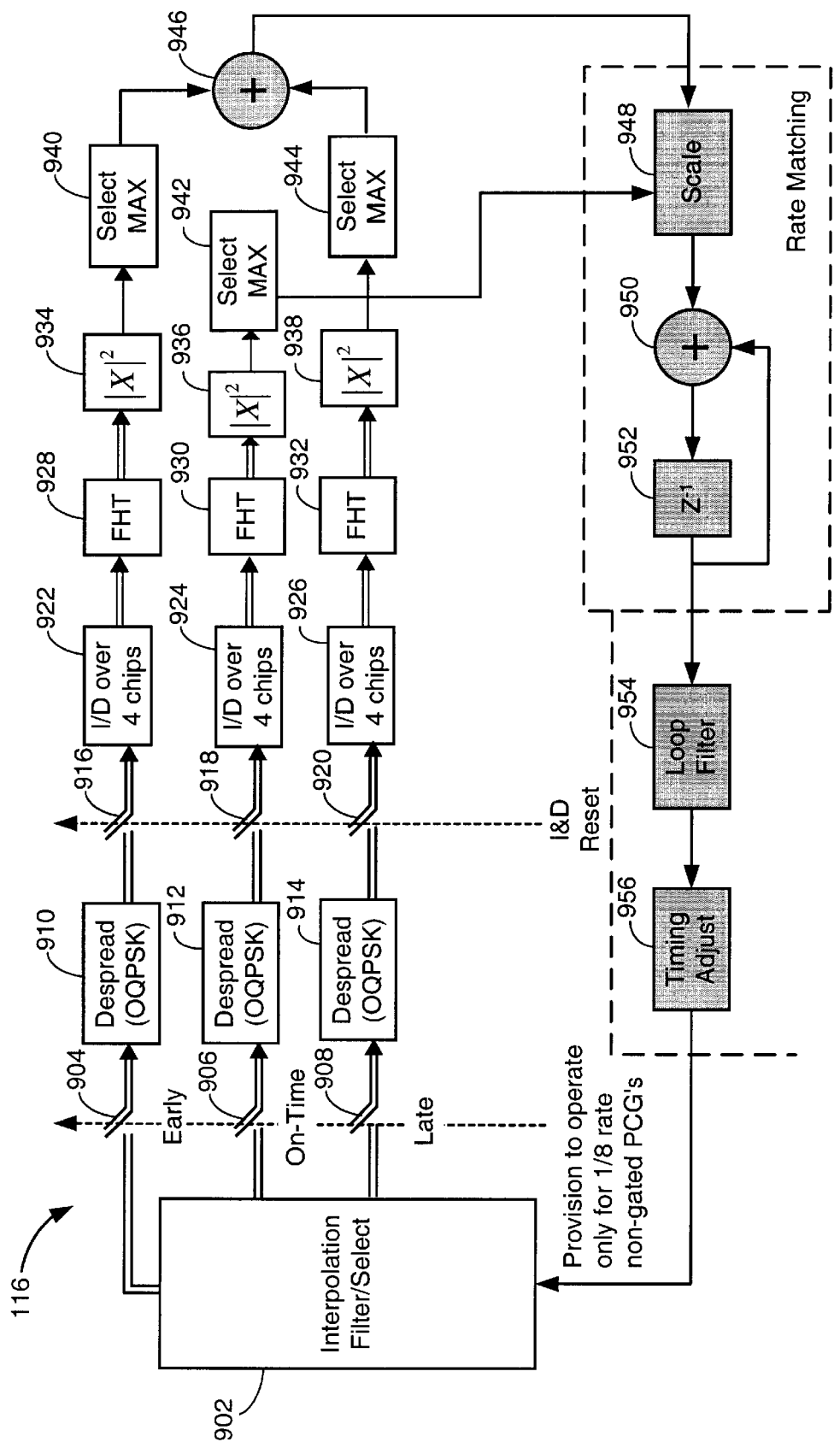
FIG. 9 illustrates another exemplary timing estimation controller in accordance with an embodiment of the invention.

FIG. 9 illustrates another exemplary timing estimation controller 116 in accordance with an embodiment of the invention. For the most part, the timing estimation controller 116 in FIG. 9 is similar to the timing estimation controller 116 in FIG. 8. In FIG. 9, however, a different dechannelization process is performed that specifically conforms to the IS95 standard and a different discriminator characteristic is produced as a result of the dechannelization process.

In FIG. 9, in conformance with the IS95 standard, the despread signals from despreaders 910–914 are integrated over 4 chips in the integrate-and-dump circuits 922–926. The integrated signals are dumped into Fast Hadamard Transform (FHT) blocks 928–932 that transform the signals into soft symbols. The transformed signals are fed into the magnitude squarers 934–938 and then select maximum blocks 940–944. In an exemplary embodiment, the select maximum blocks 940, 944 select the most likely Walsh symbol that was used to produce a discriminator characteristic. The outputs of the select maximum blocks 940, 944 are fed into the arithmetic block 946. Next, the output of the select maximum block 942 and the output from the arithmetic block 946 are fed into the scale block 948, the accumulator 950, the delay operator 952, the loop filter 954, and the timing adjustment block 956. These blocks perform mathematical functions as described above in FIG. 8. The output from the timing adjustment block 940 is provided to chip timing control code generation unit/sample select (see FIG. 1) for additional processing. In an exemplary embodiment, the output is also fed back into the interpolation filter 902 for timing adjustment of the next signals to be fed into the timing estimation block 116.

Phase Estimation Controller

Figure 10:
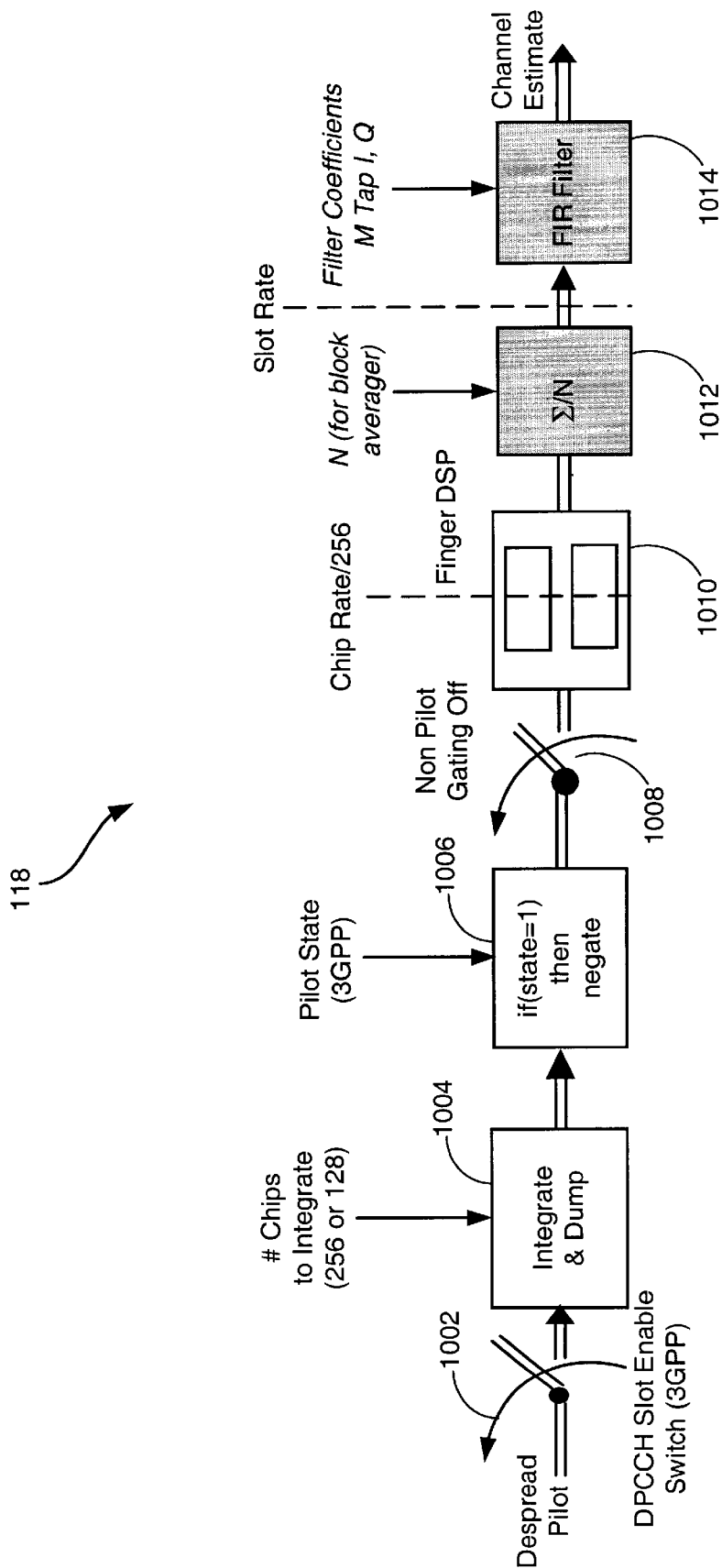
FIG. 10 illustrates an exemplary phase estimation controller in accordance with an embodiment of the invention.

FIG. 10 illustrates an exemplary phase (or channel) estimation controller 118 in accordance with an embodiment of the invention. The phase/channel estimation controller 118 receives pilot inputs from the generic dechannelizers 110–114. Pilot inputs received at the multiplexer 1002 are either admitted (gated on) or refused (gated off) depending on the pilot signal input's slot or frame format. Admitted pilot inputs are integrated over 256 or 128 chips in the integrate-and-dump circuit 1004, then the results are dumped into the pilot state negation block 1006. The pilot state negation block 1006 either maintains or negates the sign of the received signal based on the state of the pilot. Next, the output from the pilot state negation block 1006 is allowed to pass through a non pilot gating off multiplexer 1008, if the output is a pilot signal. Depending on the applicable standard, the pilot signal may not be running continuously. For example, under the IS 2000 standard, the pilot signal at a base station is always running. But under the 3GPP standard, the pilot signal is time-multiplexed and is only running some of the time. Admitted pilot signals are temporarily stored in the registers 1010 and then fed into the accumulator-over-N block 1012. The accumulator-over-N block 1012 accumulates over N symbols then divides the sum by N to obtain an average value. Next, the average value is fed into a Finite Impulse Response (FIR) filter 1014 that takes the average value and creates a weighted complex number which approximates the channel. In an exemplary embodiment, inputs into various function blocks in FIG. 10 (i.e., number of chips to integrate, pilot state, number of blocks (N) for averaging, and filter coefficient) are provided by a user. In another exemplary embodiment, the inputs are pre-determined based on the applicable standard.

Frequency Estimation Controller

Figure 11:
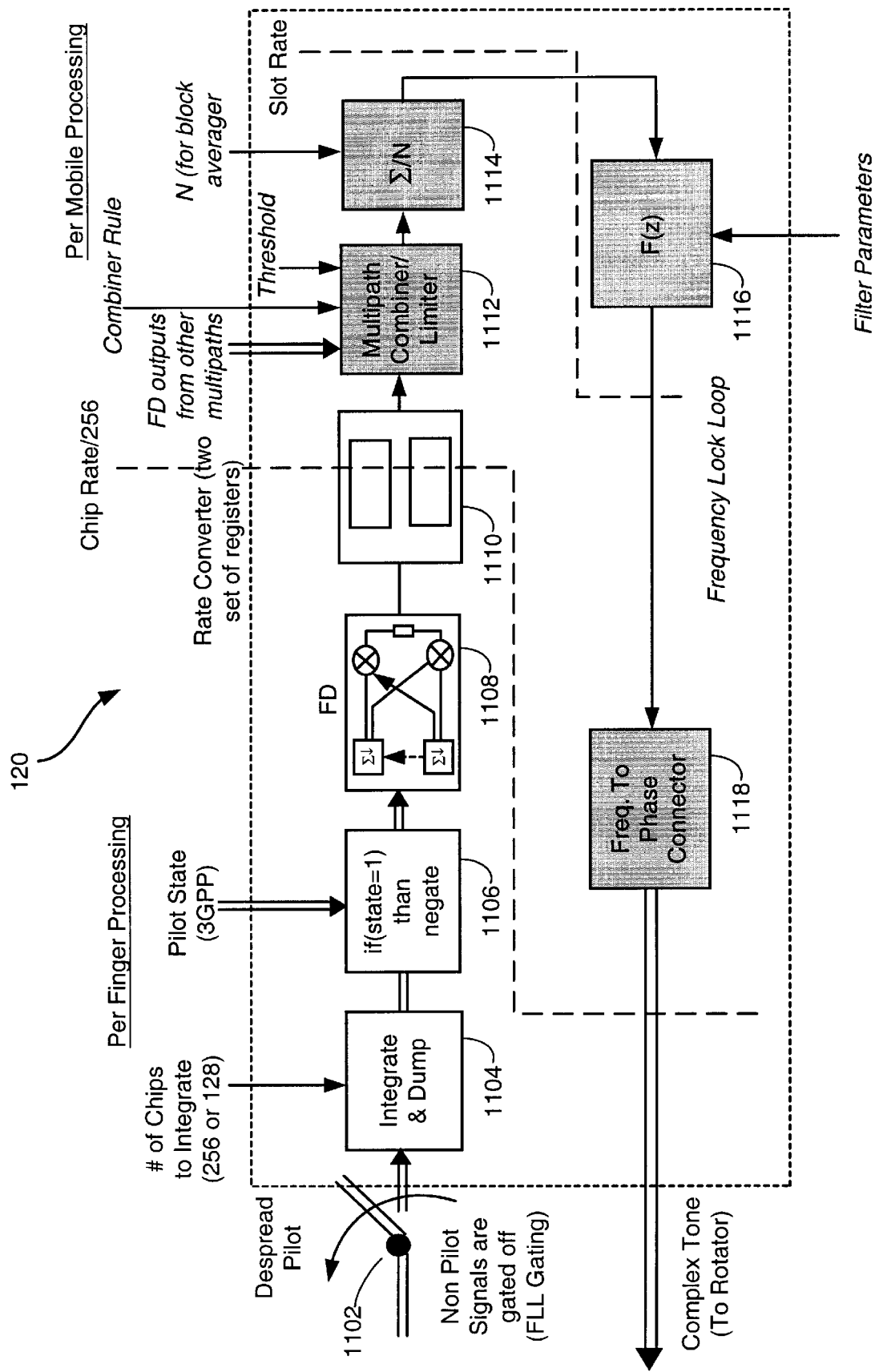
FIG. 11 illustrates an exemplary frequency estimation controller in accordance with an embodiment of the invention.

FIG. 11 illustrates an exemplary frequency estimation controller 120 in accordance with an embodiment of the invention. The frequency estimation controller 120 receives pilot inputs from the generic dechannelizers 110–114. Pilot inputs received at the multiplexer 1102 are either admitted (gated on) or refused (gated off) depending on the pilot input's slot format. Admitted pilot inputs are integrated over 256 or 128 chips in the integrate-and-dump circuit 1104, then the results are dumped into the pilot state negation block 1106. The pilot state negation block 1106 either maintains or negates the sign of the received signal based on the state of the pilot. Next, the output from the pilot state negation block 1106 is fed into a frequency discriminator 1108, if the applicable standard is 3GPP. Generally, when other standards are applicable, the output from the pilot state negation block 1106 simply passes through to the next block (i.e., bypassing the frequency discriminator 1108). The frequency discriminator 1108 takes the In-Phase and Quadrature signals and performs a quadri-correlation operation. That is, the frequency discriminator 1108 multiplies the In-Phase signal to a conjugate delayed version of the Quadrature signal, multiplies the Quadrature signal to a conjugate delayed version of the In-Phase signal, then subtracts the resulting products. This process is well known in the art. The output from the frequency discriminator 1108 is temporarily stored in the registers 1110 then fed into the multipath combiner limiter 1112. In an exemplary embodiment, the output from the frequency discriminator 1108 is stored in the registers 1110 at one rate and then read out by the multipath combiner limiter 1112 at a different rate based on the combiner update rate. The multipath combiner limiter 1112 takes the output from the registers 1110, other frequency discriminator outputs (not shown), combiner rules (provided by a user or standard), and a threshold value (provided by a user or standard), then compares the outputs to the threshold value in accordance with the combiner rules to decide whether to accept each output for accumulation. Next, if the output is accepted, it is fed from the multipath combiner limiter 1112 into accumulator-over-N block 1114 that accumulates these values for N symbols and then divides the sum by N to obtain an average value. The average value is fed into a frequency loop transfer function 1116, which can be a first-order filter or a second-order filter depending on design parameters. The output from the frequency loop transfer function 1116 is fed into a frequency-to-phase converter 1118 that converts the output from frequency to a phase value.

In an exemplary embodiment, inputs into various function blocks in FIG. 11 (i.e., number of chips to integrate, pilot state, FD outputs from other multipaths, combiner rules, threshold value, number of blocks (N) for averaging, and filter parameters) are provided by a user. In another exemplary embodiment, the inputs are pre-determined depending on the applicable standard. The output from the frequency estimation controller 120 is passed to a rotator (see FIG. 1) for further processing.

Energy Estimation Controller

Figure 12:
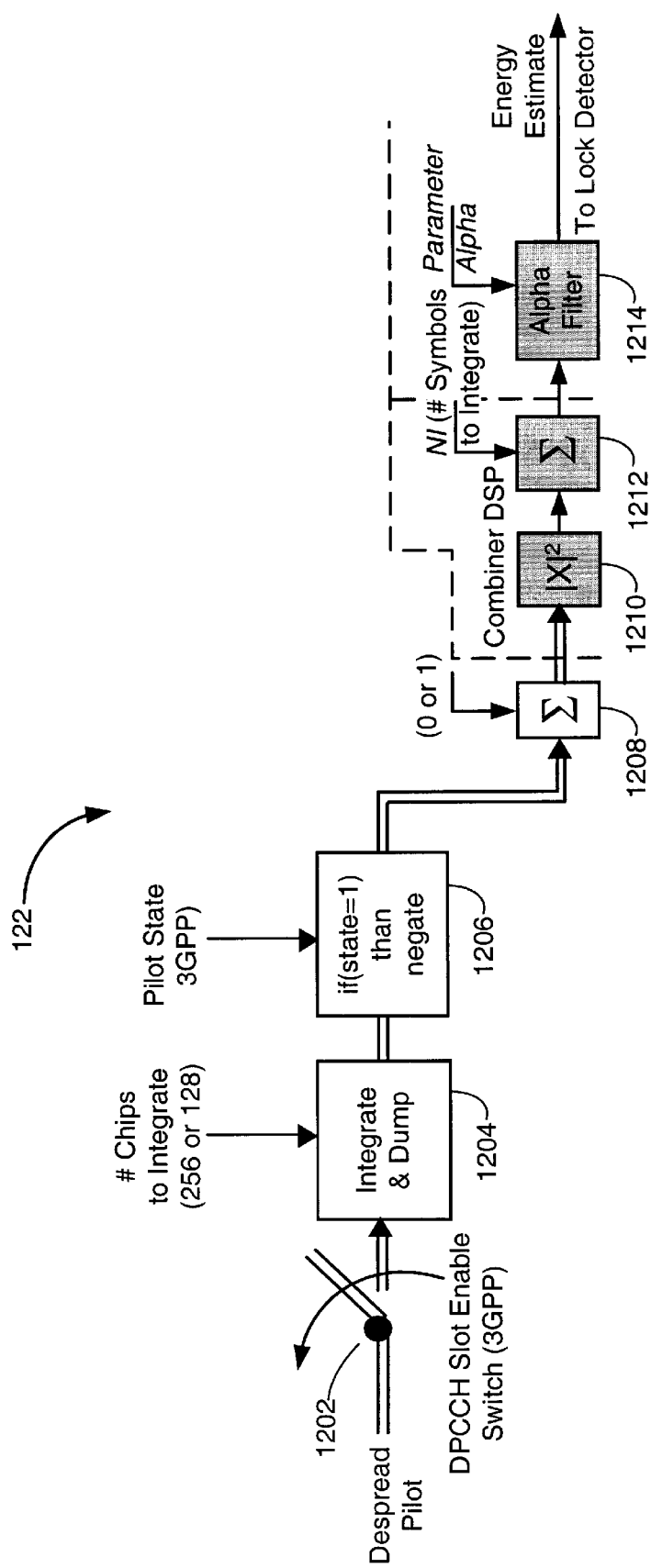
FIG. 12 illustrates an exemplary energy estimation controller in accordance with an embodiment of the invention.

FIG. 12 illustrates an exemplary energy estimation controller 122 in accordance with an embodiment of the invention. The energy estimation controller 122 receives pilot inputs from the generic dechannelizers 110–114. Pilot inputs received at the multiplexer 1202 are either admitted (gated on) or refused (gated off) depending on the pilot input's slot format. Admitted pilot inputs are integrated over 256 or 128 chips in the integrate-and-dump circuit 1204, then the results are dumped into the pilot state negation block 1206. The pilot state negation block 1206 either maintains or negates the sign of the received signal based on the state of the pilot. Next, output from the pilot state negation block 1206 is fed into a first accumulator 1208, which determines whether or not to accumulate a signal depending on an externally provided input of zero or one. That is, when the first accumulator 1208 receives an input of the value of one, the signal from the pilot state negation block 1206 is accumulated; when the first accumulator 1208 receives an input of the value of zero, the signal from the pilot state negation block 1206 is not accumulated. The externally provided input of one or zero is either fed by a user or determined by an applicable standard. In general, the first accumulator 1208 accumulates over a number of symbols based on the spreading factor to obtain a reliable average energy value estimate for each finger. Next, the accumulated value from the first accumulator 1208 is fed into a magnitude squarer 1210, which squares the magnitude of the accumulated value. The output from the magnitude squarer 1210 is fed into a second accumulator 1212, which also receives an input of N (from a user or based on a standard). The second accumulator 1212 accumulates and integrates squared magnitude values over N symbols. The output from the second accumulator 1212 is fed into an alpha filter 1214, which filters out the noise generated by the first accumulator 1208, the second accumulator 1212, and the magnitude squarer 1210. The alpha filter 1214 is a low pass filter that is parameterizable. The alpha filter 1214 outputs an estimate of the energy for a specific finger under consideration and provides the output to gain control (see FIG. 1) for further processing.

In an exemplary embodiment, inputs into various function blocks in FIG. 12 (i.e., number of chips to integrate, pilot state, accumulate on (1) or accumulate off (0), number of blocks (N) for averaging, and alpha filter parameters) are provided by a user. In another exemplary embodiment, such inputs are predetermined depending on the applicable standard.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A receiver finger in a spread spectrum system, comprising:

a plurality of generic despreader/descrambler units;

a plurality of generic dechannelizer units coupled to said plurality of generic despreader/descrambler units;

at least one timing estimation controller coupled to said plurality of despreader/descrambler units;

at least one phase estimation controller coupled to said plurality of dechannelizer units;

at least one frequency estimation controller coupled to said plurality of dechannelizer units; and at least one energy estimation controller coupled to said plurality of dechannelizer units.

2. The receiver finger of claim 1, wherein at least one of said plurality of generic despreader/descrambler units is coupled to a generic code generation unit for receiving despreading code and descrambling code.

3. The receiver finger of claim 1, wherein said plurality of generic dechannelizers are coupled to a generic code generation unit for receiving dechannelization codes.

4. The receiver finger of claim 1, wherein said plurality of generic despreader/descrambler units selectively receives Early, On-Time, and Late samples.

5. The receiver finger of claim 1, wherein said plurality of generic dechannelizer units receives inputs from at least one of said plurality of generic despreader/descrambler units.

6. The receiver finger of claim 1, wherein said phase estimation controller is coupled to at least one of said plurality of generic dechannelizer units to receive a pilot signal.

7. The receiver finger of claim 1, wherein said frequency estimation controller is coupled to at least one of said plurality of generic dechannelizer units to receive a pilot signal.

8. The receiver finger of claim 1, wherein said energy estimation controller is coupled to at least one of said plurality of generic dechannelizer units to receive a pilot signal.

9. The receiver finger of claim 1, wherein said timing estimation controller is coupled to at least one of said plurality of generic despreader/descrambler units to receive Early, On-Time, and Late samples.

10. The receiver finger of claim 1, wherein said timing, phase, frequency, and energy estimation controllers are implemented in an instruction set processor.

11. The receiver finger of claim 10, wherein said instruction set processor is a programmable micro digital signal processor.

12. The receiver finger of claim 1, wherein said timing, phase, frequency, and energy estimation controllers are implemented in a parameterizable hardware.

13. The receiver finger of claim 12, wherein said parameterizable hardware includes application specific integrated circuits.

* * * * *